Feb. 25, 1958 — C. E. NEISLER, JR., ET AL — 2,824,592
VEHICLE TRACTION DEVICE
Filed April 28, 1955 — 3 Sheets-Sheet 1

INVENTORS
Charles E. Neisler Jr.
Paul Mauney
BY
ATTORNEYS

Feb. 25, 1958 C. E. NEISLER, JR., ET AL 2,824,592
VEHICLE TRACTION DEVICE
Filed April 28, 1955 3 Sheets-Sheet 2
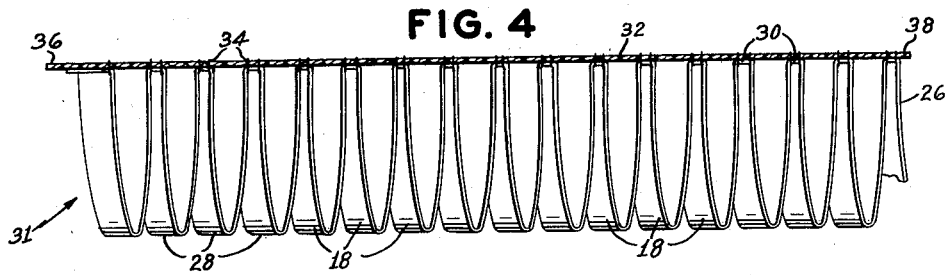
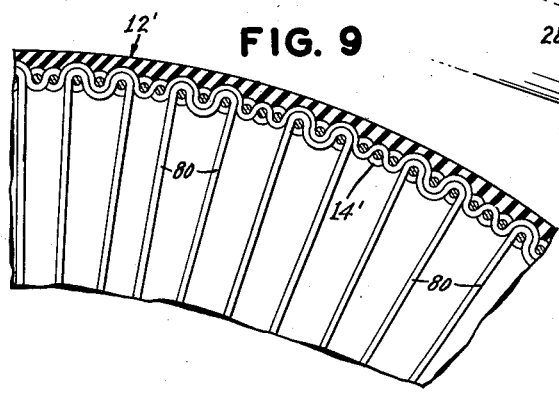
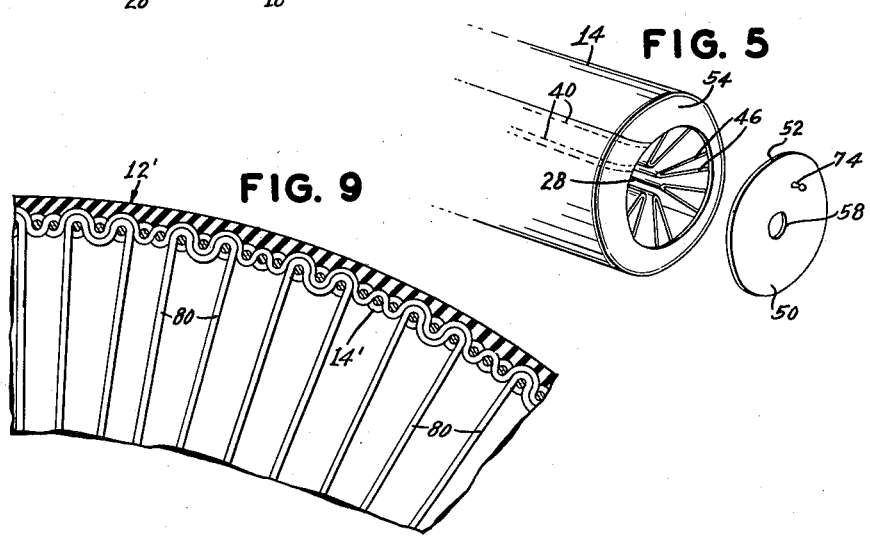
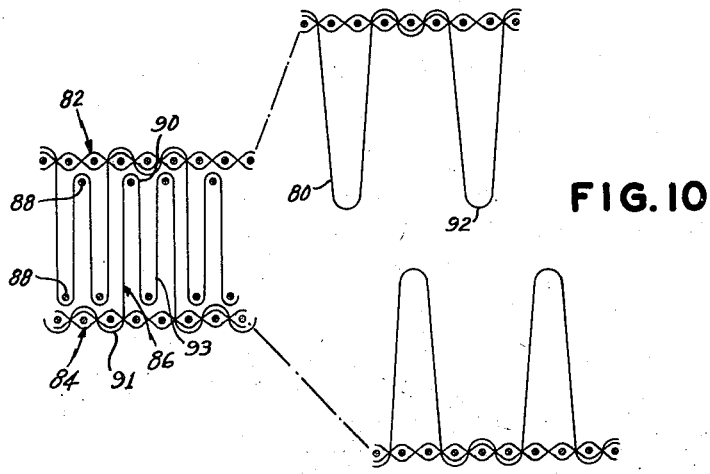
INVENTORS
Charles E. Neisler Jr.
BY Paul Maurney
ATTORNEYS Feb. 25, 1958   C. E. NEISLER, JR., ET AL   2,824,592
VEHICLE TRACTION DEVICE
Filed April 28, 1955   3 Sheets-Sheet 3

INVENTORS
Charles E. Neisler Jr.
BY Paul Mauney

ATTORNEYS

United States Patent Office 2,824,592
Patented Feb. 25, 1958

2,824,592

VEHICLE TRACTION DEVICE

Charles Eugene Neisler, Jr., and Paul Mauney, Kings Mountain, N. C., assignors to Neisler Brothers, Incorporated, a corporation of North Carolina Application April 28, 1955, Serial No. 504,435

5 Claims. (Cl. 152—9)

This invention relates generally to a vehicle traction device and, more particularly, to an inflatable vehicle traction device.

The primary aim and object of the present invention is the provision of an inflatable vehicle traction device which is of light weight construction, readily collapsible, and which is capable of supporting a heavy load with low pressure inflation, said traction device being adapted to be driven from a centrally disposed hub member.

Another object of the present invention is the provision of an inflatable vehicle traction device which has a highly flexible running surface of large area which provides excellent traction and is yieldable to surface obstructions without puncturing whereby said traction device is eminently suitable for use over rough or irregular terrain.

Another object of the present invention is the provision of an inflatable vehicle traction device of the above character which is provided with internally disposed means extending between the casing and its centrally disposed hub member for internally reinforcing said casing and transmitting the torque applied thereto from said hub member.

The above and other objects, features and advantages of the present invention will be more fully understood from the following description considered in connection with the accompanying illustrative drawings.

In the drawings which illustrate the best modes now contemplated by us for carrying out our invention:

Fig. 4 is a view of a length of sheet material having sheet material portions secured thereto, the latter forming the torque transmission elements of the completed vehicle traction device;

Fig. 5 is a fragmentary end perspective view of the vehicle traction device in a partially finished condition;

Fig. 9 is an enlarged view of a portion of Fig. 8; and

Fig. 10 is a diagrammatic view of fabric material illustrating the step of extending the length of the pile loops of the fabric layers.

Figure 1:
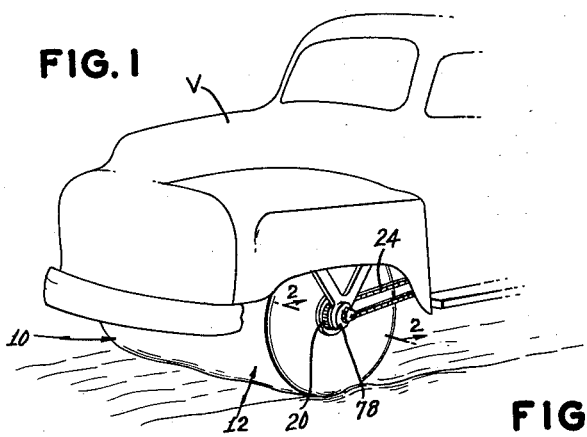
Fig. 1 is a front perspective view of a vehicle traction device, formed according to the present invention, shown mounted to a vehicle.
Figure 3:
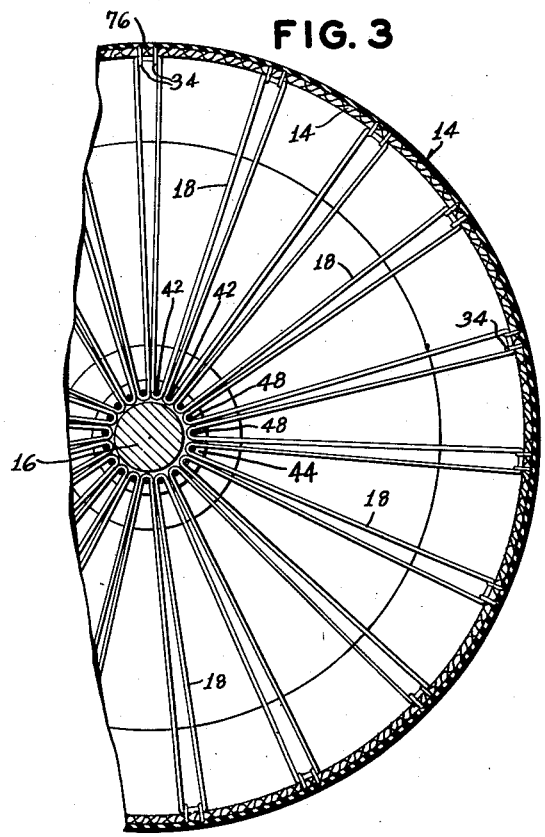
Fig. 3 is a sectional view taken on the line 3—3 of Fig. 2.

With reference to the drawings and, more particularly, to Figs. 1 through 5 thereof, there is shown a traction device 10 mounted across the front end of a vehicle V for supporting said vehicle for movement over the ground, said traction device comprising a casing 12 formed of flexible fluid-impervious material which is adapted to be inflated to a relatively low pressure, for example a pressure of the order of two or three pounds per square inch. The casing 12 comprises a peripherally continuous cylindrical wall 14 of fabric material and said wall is secured to the axially disposed hub member 16 through the intermediation of the series of radially extending elements 18, the latter being secured to said hub member and to the cylindrical wall 14 in the manner to be described in detail hereinafter. The hub member 16 extends through the casing 12, centrally thereof, and forms the axis of revolution of the traction device, said hub member being adapted to be driven from a suitable power source for rotating the traction device whereby to move the vehicle V over the ground. The hub member 16 may be driven from a suitable power source in any desired manner and in the illustrated embodiment said hub member has a sprocket member 20 secured to the end portion 22 thereof and said sprocket is driven by means of the drive chain 24 shown in Fig. 1. The elements 18, which in the embodiment of Figs. 1–5 are constituted by a series of sheet material portions or segments, are adapted to transmit the torque of the hub member 16 to the casing 12 and said sheet material portions are disposed internally of the casing and extend radially between the hub member 16 and the peripheral wall 14 which may be formed of any suitable flexible material, for example a suitable textile material.

With reference to Fig. 4, the series of flexible sheet material portions 18 may be constituted by integral portions of a single length or strip of material 26 which is folded in the manner illustrated in Fig. 4 to provide a multiplicity of free looped ends 28 at one side of blank assembly 31 and a series of sewing strips 30 at the opposite side thereof, said sewing strips being secured to the flat fabric material 32 by the lines of stitching 34, or in any other suitable manner. It will be understood that the elements or segments 18 extend for substantially the full length of the vehicle traction device and accordingly the looped ends and sewing strips 28 and 30, respectively, are of corresponding length. While the portions 18 of the instant embodiment are constituted by integral portions of the fabric strip 26 it will be understood that said portions may be formed in any desired manner and may be individually formed or formed of multiple lengths of material corresponding to the material 26. The length of flat material 32 may be readily formed into the peripherally continuous cylindrical wall 14 in any desired manner as by overlapping the end marginal strips 36 and 38 of said material and securing said overlapped strips together in any suitable manner, for example by means of the lines of stitching 40, shown in Fig. 5. Thus the cylindrical peripherally continuous wall 14 is formed of initially flat material which has a series of elements 18 secured thereto in its initially flat form.

Figure 2:
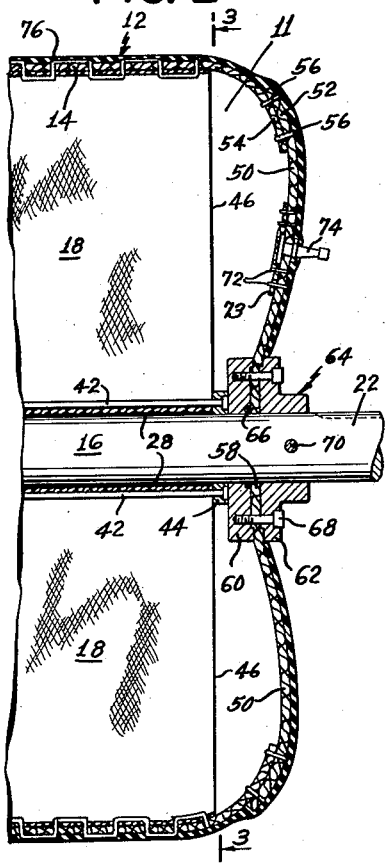
Fig. 2 is a sectional view, on an enlarged scale, taken on the line 2—2 of Fig. 1.

The looped inner ends 28 of the series of fabric portions or elements 18 may be secured in fixed relation with the hub member 16 in any desired manner, and in the illustrated embodiment the longitudinally extending securing rods 42 are threaded through said looped ends and are secured in fixed relation to the hub member 16 through the intermediation of the retainer members 44. The retainer members 44, one of which is shown in Fig. 2, are disposed at the opposite ends of the casing 12 adjacent the end edges 46 of the elements 18. The retainer members are fixed to the hub member 16 internally of the casing in any suitable manner and said retainer members are provided with a series of circumferentially spaced apertures 48 which are concentrically arranged relative to the hub member 16. Accordingly the rods 42 are supported at their opposite ends by means of the retainer members 44, each rod being extended through a looped end 28 and a companion pair of aligned apertures 48 provided in said retainer members. It will be understood that the retainer members 44 are secured to the hub member 16 so that the companion pairs of apertures 48 are aligned for registry with their companion securing rods 42.

The circular end wall 50 of the casing 12 is secured to the arcuately inturned marginal edge portion 54 of the cylindrical wall 14 and to the hub member 16 in fluid-sealing relation therewith subsequent to the securement of the looped ends 28 of the elements 18 to the hub member by means of the securing rods 42. The peripherally extending marginal edge portion 52 of the wall 50 is secured to the peripherally extending marginal edge portion 54 of the wall 14 by means of the spaced lines of stitching 56, said marginal edge portions 52 and 54 being disposed in overlapping disposition, as clearly shown in Fig. 2. It will be apparent that the overlapped marginal edge portions 52 and 54 may be secured to each other in any suitable manner as by a cementing operation or by the latter coupled with a sewing operation. The inner peripherally extending marginal edge portion 58 of the end wall 50, defined by the central opening thereof, is clamped between the complementary parts 60 and 62 of the fluid-sealing clamping device 64, there being preferably interposed between the part 60 and said portion 58 a peripherally extending sealing ring 66. The parts 60 and 62 are retained in clamped fluid-sealing engagement by means of a peripherally spaced series of clamping bolts 68. The part 62 may be fixed to the hub member 16 in any suitable manner, for example by means of pin 70. From the above it will be apparent that the peripherally extending marginal edge portion 58 of the end wall 50 is secured to the hub member 16 in fluid-sealing relation therewith by means of the clamping device 64. Secured to the end wall 50 in any suitable manner as by means of the lines of stitching 72, is a valve retaining segment 73 for the valve 74 which provides for the controlled inflation and deflation of the chamber 11 defined by the casing 12. While only one end wall 50 of the casing 12 is illustrated it will be understood that the opposite end wall is in all respects identical except that such opposite end wall need not be provided with a valve corresponding to valve 74. While separate end walls 50 are utilized in the instant embodiment it will be understood that, if desired, such end walls may be constituted by integral end portions of the peripheral wall 14 which are suitably secured to the hub member 16 in fluid-sealing relation therewith. The casing 12 has an external layer 76 of any suitable fluid-impervious material such as rubber, rubber compounds, plastic, or the like to render said casing fluid-impervious and to impart to the latter a frictional running surface. The fluid-impervious layer 76 may be applied to the external surfaces of the walls 14 and 50 in any suitable manner and said layer may be of a character to reinforce the casing and to provide the running surface thereof with the desired frictional characteristics.

The end portion 22 of the hub member 16 is rotatably mounted in the frame part 78 of the vehicle, it being apparent that the opposite end of the hub member 16 is similarly rotatably mounted in a companion frame part corresponding to frame part 78. From the above it will be apparent that the flexible sheet elements 18 internally reinforce the traction device 10 and provide for the transmission of the torque of the hub member 16 to the casing 12. Thus each of the torque transmission elements or portions 18 transmits the torque from the hub member to an adjacent area of the casing whereby the provision of the series of elements 18 will effect the transmission and uniform distribution of the torque to the casing whereby the latter may be driven from its centrally disposed hub member 16.

Figure 6:
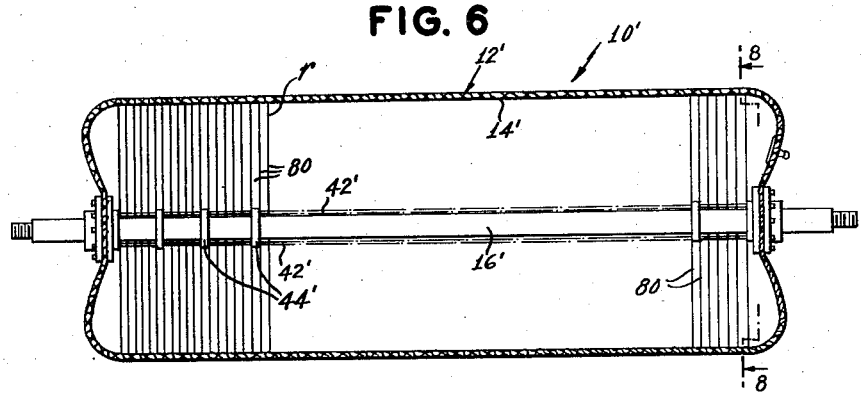
Fig. 6 is a vertical sectional view of a modified form of vehicle traction device.
Figure 8:
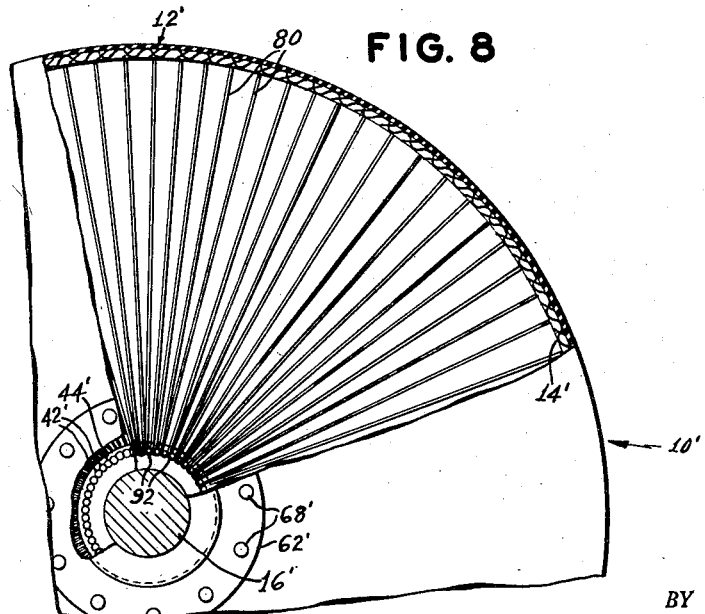
Fig. 8 is a sectionl view, on an enlarged scale, taken on the line 8—8 of Fig. 6.

With reference to Figs. 6, 8 and 9, there is shown a modified form of vehicle traction device 10′ which comprises a casing 12′ having a peripherally continuous cylindrical wall 14′ which may be formed of any suitable pile fabric material. Thus the wall 14′ may be formed of any suitable woven or sewn pile fabric material and in the instant embodiment the wall 14′ is formed of a woven pile fabric material having relatively long looped piles 80. Thus while any looped pile fabric material may be utilized to form the casing 12′, fabric material having piles of the general character disclosed in application, Serial No. 360,435, filed June 9, 1953, for Improvements in Fabrics and Method of Making Same in the name of Charles E. Neisler, Jr. and assigned to the assignee herein is eminently suitable for the formation of said casing.

With reference to Fig. 10, the fabric layers 82 and 84 are woven so that the pile threads 86 thereof are temporarily supported by means of the weft threads 88 so that when the looped portions 90 of said pile threads are released from temporary support in the manner described in detail in the above referred to application said pile threads may be extended to the condition 89. More particularly, the portions 91 of the pile threads 86 are interwoven with an associated fabric layer and the portions 93 intermediate the interwoven portions thereof are temporarily supported by the association of the looped portions 90 of said pile threads with the temporary weft threads 88 which may be disposed inwardly or outwardly of the fabric layers as described in detail in the aforereferred to application. Thus the pile threads 86 are interwoven with a single fabric layer only. It will be understood that, if desired, a single fabric layer 82 or 84 may be woven individually to provide fabric material having relatively long piles 80 which are adapted to form the torque transmission elements of the vehicle traction device 10′. The method of providing the relatively long piles or torque transmission elements 80 in the manner illustrated in Fig. 10, corresponds to the method described in the above referred to application except that pursuant to the instant method the piles 80 are interwoven with a single fabric layer only. It will be readily apparent that any desired length of pile 80 may be obtained pursuant to the method of Fig. 10, which is given by way of example only. The looed ends 92 of the series of elements 80 are secured to the hub member 16′ by means of the rods 42′ which correspond to the rods 42 of the previously described embodiment. Any desired number of retainer members 44′ may be spaced along the length of the member 16′ and each of the rods 42′ extends through a series of pile looped ends 92 for securing the latter in fixed relation to the hub member 16′.

Figure 7:
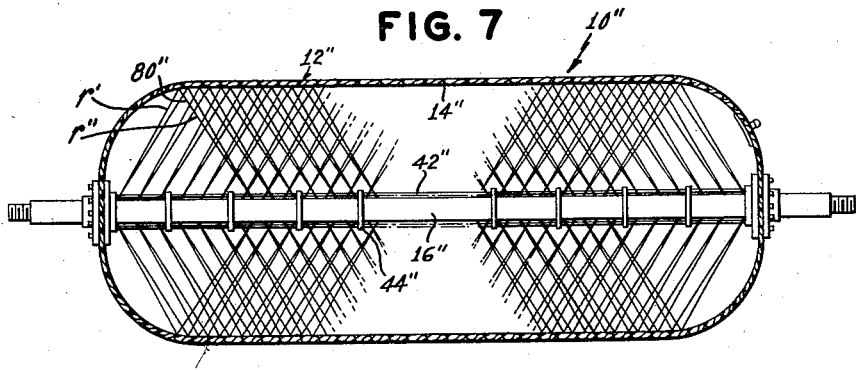
Fig. 7 is a view similar to Fig. 6 showing a further modified form of vehicle traction device.

From the above it will be apparent that the vehicle traction device 10′ is structurally similar to the traction device 10 previously described except that in the traction device 10′ the torque transmission elements are constituted by a series of radially extending piles 80, the cylindrical peripherally extending wall 14′ being thus constituted by any suitable pile fabric material. The looped piles 80 may be arranged and spaced in any desired manner and in the traction device 10′ the looped piles 80 thereof are arranged in a series of longitudinal rows *r* with said piles being perpendicularly disposed to the axis of revolution of the device. The vehicle traction device 10″ corresponds in all respects to the device 10′ except that in device 10″ the piles 80″ thereof are arranged in a series of longitudinally extending rows *r′* and *r″* with the piles 80″ of alternate rows *r′* extending in one oblique direction to the axis of revolution of the traction device and with the piles 80″ of intervening alternate rows *r″* extending in an opposite oblique direction to said axis of revolution. This inclined arrangement of the looped piles 80″ provides for the increase of the lateral stability of the vehicle traction device 10″. It will also be apparent that the inclined pile arrangement of the vehicle traction device 10″ provides for the utilization of the same length of piles for different casing diameters by altering the angle of inclination of the looped piles 80″ to the axis of rotation of said device. Thus the same length of looped piles 80″ may be utilized to provide a casing of smaller or larger diameter than that shown in Fig. 7 by correspondingly modifying the angle of inclination of said looped piles. While specific pile fabric arrangements have been illustrated and described herein it will be apparent that it is within the scope of the present invention to arrange the piles internally of the casing in any desired manner.

It will also be apparent that the torque transmission elements 18, 80 and 80" extending between the hub member and the cylindrical wall of the casing may be constituted by flexible elements of any desired form and arrangement. The torque transmission elements are preferably disposed in closely adjacent relation in order to provide for a uniform distribution and transmission of the stresses from the hub member to the casing. The hub member 16 may be of solid or hollow construction and may be of any desired diameter and similarly the retainer members 44 and 44' and their companion retainer structure may be of any desired size and construction whereby to provide for the anchorage of the inner ends of the torque transmission elements relative to the hub member.

It will be apparent from the above that the vehicle traction device, formed pursuant to the present invention, is inherently of light weight construction and is readily collapsible by deflating the fluid chamber 11 defined by the casing. The vehicle traction device is of a relatively large area and is thus capable of supporting a heavy load when inflated to a low pressure, said traction device being adapted to be driven from a centrally disposed hub member. The running surface of the vehicle traction device is thus of large area and is constituted to provide excellent traction, said surface being readily yieldable to surface obstructions without puncturing so that a traction device of the character described herein is eminently suitable for use over rough or irregular terrain. The hub member and the torque transmission elements internally reinforce the casing and said elements provide for the transmission of the torque stresses applied by the hub member to the casing, said elements uniformly distributing such stresses to the casing whereby the latter may be driven from its centrally disposed hub member. The vehicle traction device may extend entirely across the vehicle as shown in Fig. 1 or a plurality of vehicle traction devices may be associated with a vehicle in any desired manner for driving the latter. The vehicle traction device may be of any desired configuration and the cylindrical configuration herein illustrated and described is given by way of example only.

It will be understood that while the primary utility of the present invention has been described with reference to low pressure traction devices, it is within the scope of the present invention to provide traction devices or other devices which are inflated at medium or high pressures. In this connection it will be noted that the construction provided in accordance with the present invention makes possible the provision of a device for traction or for other purposes which may be of light weight and yet capable of being inflated at high pressures. More specifically, the provision of the multiplicity of radially extending elements, which are connected to the central or hub member and to the outer circumferentially extending member or casing at comparatively closely spaced points on the last mentioned member, enable the circumferentially extending member or casing 12 in the case of the construction shown by Figs. 1 to 5, as well as the casings 12' and 12", to be made of comparatively light weight material inasmuch as the casing is supported and held by said radially extending element 18, 80, and 80", respectively, in a tensioned condition of the latter.

While we have shown and described the preferred embodiments of our invention, it will be understood that various changes may be made in the idea or principles of the invention within the scope of the appended claims.

Having thus described our invention, what we claim and desire to secure by Letters Patent is:

1. A vehicle traction device, comprising an inflatable casing formed of flexible fluid-impervious textile material having a centrally axially disposed hub member forming the axis of revolution of the traction device, said casing comprising a cylindrical wall forming the rolling surface of the traction device and end walls, said hub member being secured to said end walls in fluid sealing relation therewith, and a radially extending series of flexible elements disposed internally of said casing and connected to said cylindrical wall and said hub member along the entire longitudinal extents thereof, respectively, for transmitting the torque of said member to said cylindrical wall, said connection of said flexible elements to said hub member including means in fixed relation with said hub member and extending longitudinally thereof about which said elements are looped, whereby to retain said elements under radial tension to prevent said casing from expanding under internal pressure.

2. A vehicle traction device, comprising a fluid-impervious inflatable flexible casing having a centrally disposed member forming the axis of revolution of the traction device, said casing having wall portions comprising pile fabric material, the piles thereof being disposed internally of said casing and extending to said member in secured relation therewith along the entire longitudinal extent thereof, said piles thereby transmitting the torque of said member to said casing, said securement of said piles to said member being effected by rods in fixed relation to said member and extending longitudinally thereof about which said piles are engaged, whereby to retain said piles under radial tension to prevent said casing from expanding under internal pressure.

3. A vehicle traction device, comprising a fluid-impervious inflatable flexible casing having a centrally disposed member forming the axis of revolution of the traction device, and means disposed internally of said casing and extending between said member and said casing for transmitting the torque applied to said member to said casing, said means comprising flexible sheet material portions secured at their opposite edges to said casing and said member, respectively, said securement of said portions to said member being constituted by rods to which said portions are secured, said rods extending longitudinally of said member and being secured thereto.

4. A vehicle traction device, comprising a fluid-impervious inflatable flexible casing having a centrally disposed member forming the axis of revolution of the traction device, and means disposed internally of said casing and extending between said member and said casing for transmitting the torque applied to said member to said casing, said means comprising a continuous strip of flexible sheet material having portions thereof secured at their opposite edges to said casing and said member, respectively.

5. A traction device for supporting a vehicle for movement over the ground, comprising a casing formed of flexible fluid-impervious material adapted to be inflated to a relatively low pressure, said casing comprising a peripherally continuous cylindrical wall formed of fabric material having looped piles secured thereto along the entire longitudinal extent thereof, and a hub member axially disposed in said casing and forming the axis of revolution thereof, securing elements extending longitudinally of said member and fixed thereto, said piles of said fabric material being disposed internally of said casing and having their looped end portions secured about said securing elements in radially extending dispositions, said piles thereby constituting torque transmission elements between said hub member and said casing.

References Cited in the file of this patent

UNITED STATES PATENTS

| | | |
|---|---|---|
| 2,431,897 | Wensley | Dec. 2, 1947 |
| 2,709,982 | Straussler | June 7, 1955 |
| 2,714,011 | Albee | July 26, 1955 |

FOREIGN PATENTS

| | | |
|---|---|---|
| 469,464 | France | Aug. 1, 1914 |
| 417,088 | Great Britain | Sept. 27, 1934 |